United States Patent
Liang

(10) Patent No.: US 11,995,495 B2
(45) Date of Patent: May 28, 2024

(54) RADIO FREQUENCY IDENTIFICATION DEVICE

(71) Applicant: Securitag Assembly Group Co., Ltd., Taichung (TW)

(72) Inventor: Kai-Jun Liang, Taichung (TW)

(73) Assignee: Securitag Assembly Group Co., Ltd., Taichung (TW)

(*) Notice: Subject to any disclaimer, the term of this patent is extended or adjusted under 35 U.S.C. 154(b) by 0 days.

(21) Appl. No.: 18/175,932

(22) Filed: Feb. 28, 2023

(65) Prior Publication Data
US 2023/0394274 A1  Dec. 7, 2023

(30) Foreign Application Priority Data
Jun. 7, 2022  (TW) ................... 111121030

(51) Int. Cl.
*G06K 19/077*  (2006.01)
*H01Q 1/22*  (2006.01)
*H01Q 9/04*  (2006.01)

(52) U.S. Cl.
CPC . *G06K 19/07773* (2013.01); *G06K 19/07722* (2013.01); *H01Q 1/2225* (2013.01); *H01Q 9/0407* (2013.01)

(58) Field of Classification Search
CPC ....... G06K 19/07773; G06K 19/07772; G06K 19/00; G06K 19/04; G06K 19/07; G06Q 20/34; G06Q 20/341; H01Q 1/2225; H01Q 9/0407
USPC .................................. 235/492, 487, 380, 375
See application file for complete search history.

(56) References Cited

U.S. PATENT DOCUMENTS

| 8,950,683 B2 | 2/2015 | Liu et al. |
| 2011/0121947 A1 | 5/2011 | Kubota et al. |
| 2018/0032853 A1 | 2/2018 | Sugimura et al. |

(Continued)

FOREIGN PATENT DOCUMENTS

| CN | 102124474 A | 7/2011 |
| EP | 2169594 A1 | 3/2010 |
| JP | 2013 037653 A | 2/2013 |

(Continued)

OTHER PUBLICATIONS

Taiwanese Office Action, dated Jun. 29, 2023, in a counterpart Taiwanese patent application, No. TW 111121030.

(Continued)

*Primary Examiner* — Edwyn Labaze
(74) *Attorney, Agent, or Firm* — Chen Yoshimura LLP

(57) ABSTRACT

The present invention provides a RFID device arranged on an object surface, comprising a substrate, a first metal layer and a second metal layer. The first metal layer has a first connecting surface having a first adhering layer for adhering to the first surface of the substrate, wherein a RFID element is electrically connected to the first metal layer and a length of the first metal layer is larger than a length of the substrate such that the first metal layer has a first extending part extending outwardly from the lateral surface of the substrate. The second metal layer has a second connecting surface having a second adhering layer formed thereon for adhering the second metal layer on the second surface, wherein the first extending metal layer is attached onto but electrically insulated from the object surface or the second metal layer.

19 Claims, 12 Drawing Sheets

(56) References Cited

U.S. PATENT DOCUMENTS

2018/0359858 A1* 12/2018 Ito .......................... H01Q 7/00

FOREIGN PATENT DOCUMENTS

| JP | 2016192761 A | * 11/2016 | ............. H02J 50/12 |
| TW | 201630251 A | 8/2016 | |

OTHER PUBLICATIONS

Extended European Search Report dated Oct. 27, 2023 in a counterpart European patent application, No. EP 23162465.1.

* cited by examiner

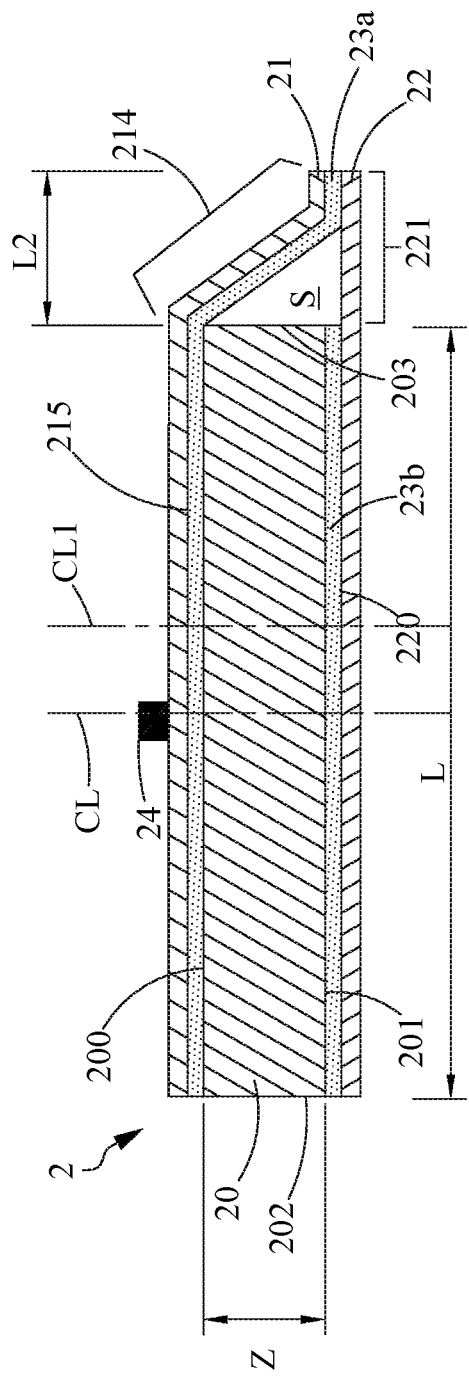
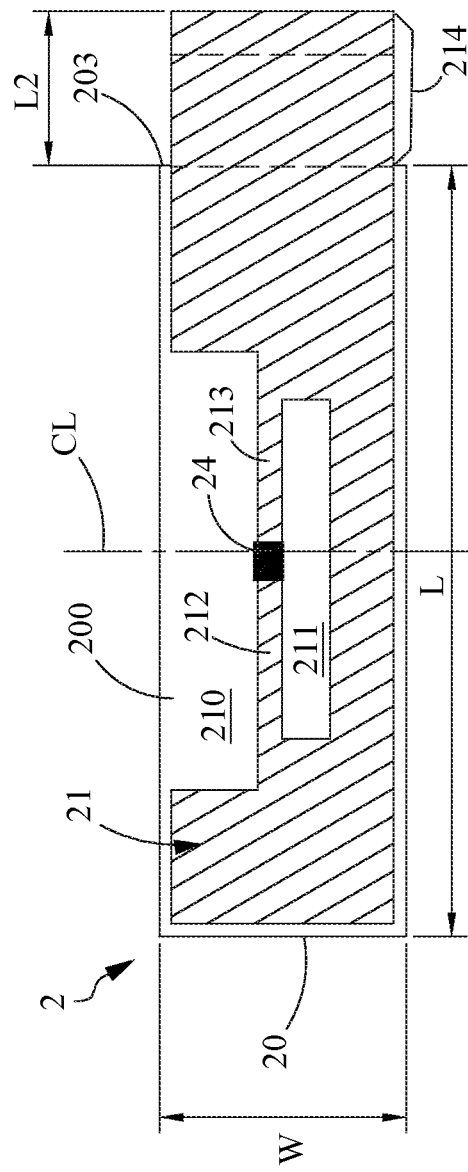
Fig. 2A
Fig. 2B

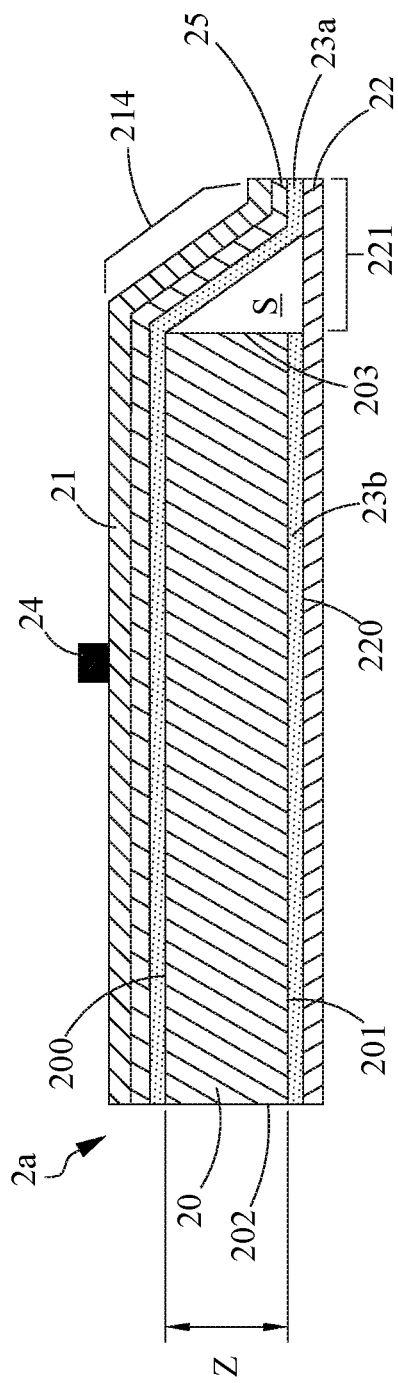
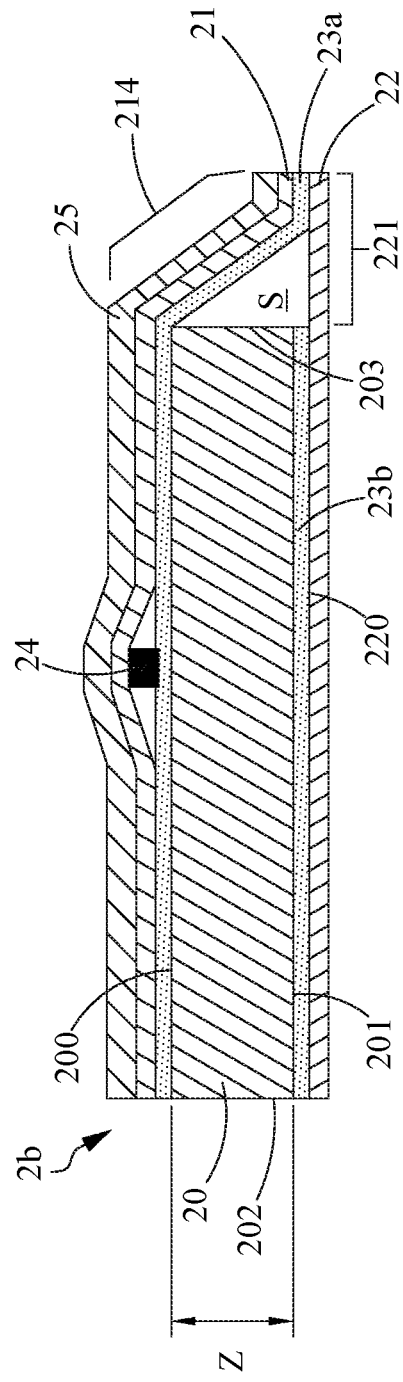
Fig. 5A
Fig. 5B

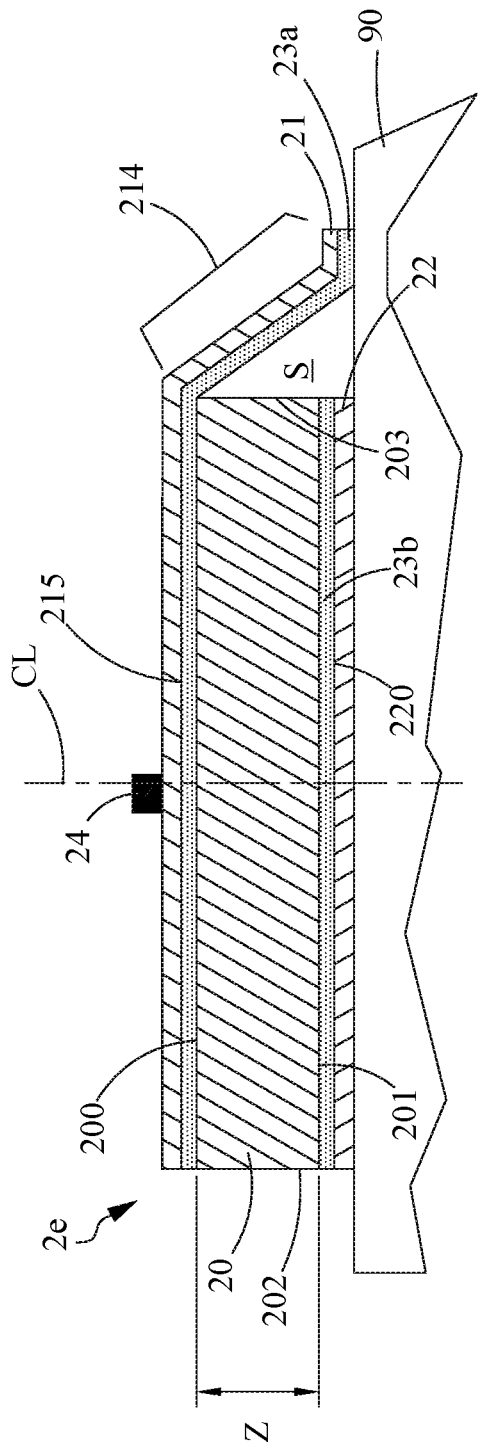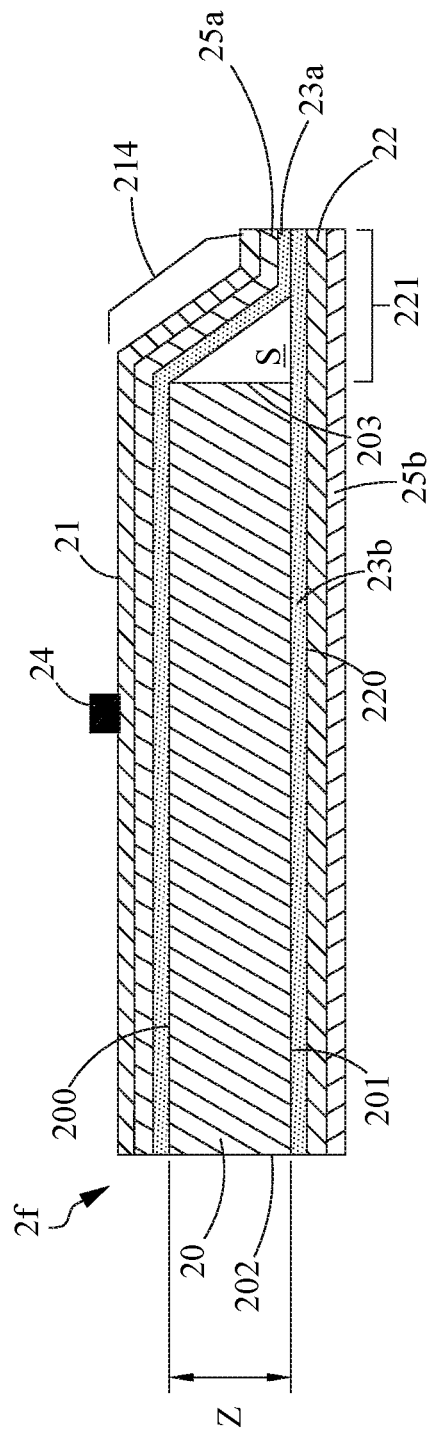

RADIO FREQUENCY IDENTIFICATION DEVICE

This application claims the benefit of Taiwan Patent Application Ser. No. 111121030, filed Jun. 7, 2022, the subject matter of which is incorporated herein by reference.

BACKGROUND OF INVENTION

1. Field of the Invention

The present invention is related to a design of antenna structure, and more particularly, to radio frequency identification (RFID) device for a metal environment.

2. Description of the Prior Art

Conventionally, when the RFID device is operated under ultra-high frequency (UHF) range, due to the characteristic of electromagnetic scattering and coupling, the RFID is sensitive to the liquid and metal environment where it is arranged. The metal or liquid environment could induce the problem that make the RFID device inoperative, if there has no proper design on the RFID device.

According to the electromagnetic theory, when the uniform electromagnetic wave is obliquely projected onto a flat antenna formed by a good conductor, a reflection phenomenon from the surface of the good conductor will be generated because there has no electromagnetic wave inside the good conductor thereby causing the RFID becoming inoperative. In addition, since the metal object to which the RFID device is attached will also reflect the electromagnetic wave, it will also cause destructive interference due to the phase variation between the incident electromagnetic wave and reflected electromagnetic wave.

In addition to the above-mentioned reasons, according to theory of current mirror, when a dipole antenna is arranged onto the top of the metal object, e.g. on the top surface of the metal object, a reverse current is induced on the bottom surface opposite the top surface, whereby electromagnetic wave is eliminated. Since the RFID device is easily affected by the metal object, the RFID device can't be utilized on the metal object effectively.

Please refer to FIGS. 1A to 1C, which illustrates conventional UHF antenna structure and antenna device that are utilized on the metal surface. In FIG. 1A, the antenna structure 1a comprises two metal layers 10a and 10b respectively adhered to the two opposite surfaces of non-metal substrate 12 through adhering layers 11a and 11b, in which the metal layer 10a is formed on a polymer material layer 100, the antenna structure 1a is adhered to the surface of the object 90, and an RFID element 13 is electrically connected to the metal layer 10a, wherein the object 90 can be metal object or non-metal object. In this conventional art, the object 90 is metal object.

In the FIG. 1B, the antenna structure 1b comprises a metal layer 10c folded to be adhered onto the top surface, lateral surface, and bottom surface of the non-metal substrate 12 thereby forming a planar inverted-F antenna (PIFA), wherein a polymer layer 100 is formed between the metal layer 10c and adhering layer 11c and the antenna structure 1b is attached onto the surface of the object 90. FIG. 1C illustrates antenna structure 1c comprising a metal layer 10d folded to be adhered on the top surface, bottom surface and two lateral surfaces of the non-metal substrate 12 through adhering layer 11d thereby forming UHF antenna structure, wherein a polymer layer 100 is formed between the metal layer 10d and adhering layer 11d, and the antenna structure 1c is attached onto the surface of the object 90.

In FIG. 1A, although the antenna structure 1a operated in UHF frequency is easily manufactured through a roll-to-roll manufacturing process, worse interrogation effect could occur easily. In addition, although the UHF antenna structures 1b and 1c shown in FIGS. 1B and 1C have merits of superior interrogating distance, the manufacturing process is more complicated because it is necessary to perform extra manufacturing steps, such as manual operation or machining operation to fold the metal layer for covering three surfaces or four surfaces of the substrate, or to form it via passing through the substrate to electrically connect the metal layer on the top surface with the bottom surface.

Accordingly, there is a need to provide radio frequency identification device for solving the problem of the conventional arts.

SUMMARY OF THE INVENTION

The present invention provides an RFID device, in which the top and bottom surfaces respectively comprises adhesive areas and a first metal layer and a second metal layer respectively formed on the adhesive areas on the top and bottom surfaces of the substrate. The adhesive areas are formed to allow the adhering layers to be attached thereon, and enable the first metal layer and the second metal layer to be adhered to each other with electrical insulation effect, whereby the RFID device can be applied in the metal environment and the interrogating distance can be effectively increased. Moreover, the manufacturing process for making the antenna device is easier than the conventional manufacturing process such that the complicated manufacturing process, such as folding process for covering three or four surfaces of the substrate of the conventional art shown in FIGS. 1B and 1C can be effectively simplified.

The present invention provides an RFID device comprising an antenna structure asymmetrically or off-center arranged onto the first surface of the substrate. In one embodiment of the asymmetric arrangement of the metal layer, a part of the first metal layer adhered onto the first surface outwardly protrudes from the lateral side of the substrate, and the protruded part has an electrically insulated connection with the second metal layer adhered onto the second surface opposite to the first surface. Since the first metal layer and the second metal layer are electrically insulated from each other, the merit that the RFID device could be manufactured easily can be achieved.

In one embodiment, the present invention provides an RFID device arranged onto a surface of an object. The RFID device comprises a substrate, a first metal layer, and a second metal layer. The substrate comprises a first surface and a second surface opposite to the first surface. The first metal layer has a first connecting surface adhered to the first surface, and an RFID element is electrically coupled to the first metal layer, wherein a length of the first metal layer is longer than a length of the substrate along a longitudinal axis such that the first metal layer has a first extension part protruding along the longitudinal axis from at least one lateral side of the substrate. The second metal layer has a second connecting surface adhered to the second surface of the substrate. The first extension part is adhered to the surface of the object or the second metal layer through an electrically insulated adhering layer such that the first metal layer is electrically insulated from the second metal layer.

BRIEF DESCRIPTION OF THE DRAWINGS

The present invention will now be specified with reference to its preferred embodiment illustrated in the drawings, in which:

FIG. 2A illustrates a cross-sectional view of an RFID device according to one embodiment of the present invention;

FIG. 2B illustrates a top view of the antenna structure shown in FIG. 2A;

FIGS. 5A to 5G respectively illustrate RFID device according to different embodiments of the present invention;

DESCRIPTION OF THE PREFERRED EMBODIMENT

Figure 1A:
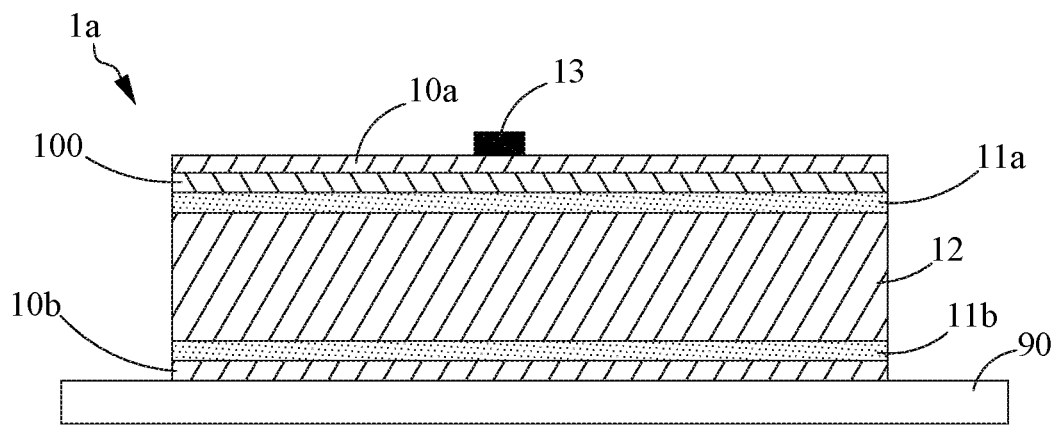
FIG. 1A to 1C illustrates conventional UHF antenna structures and antenna devices attached onto a metal surface.
Figure 1B:
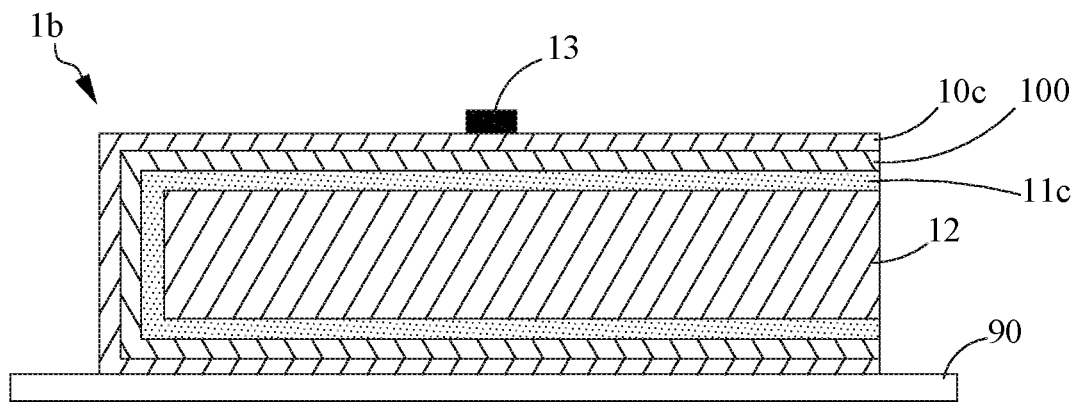
Figure 1C:
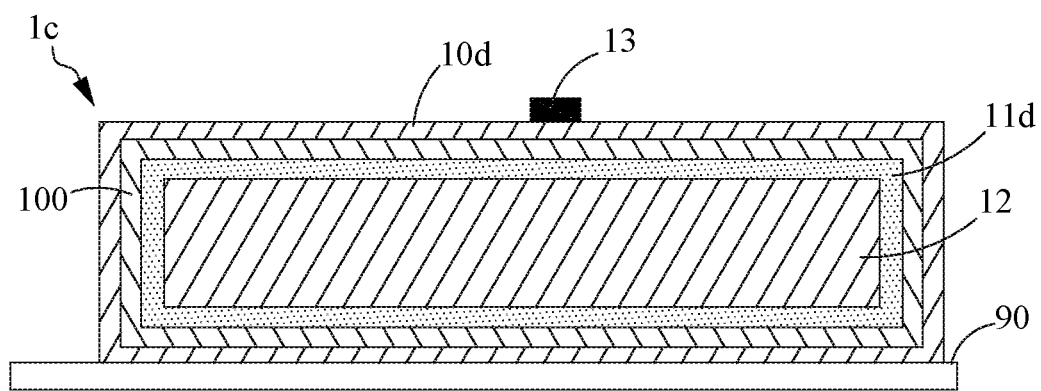

The invention disclosed herein is directed to an RFID device. In the following description, numerous details are set forth in order to provide a thorough understanding of the present invention. It will be appreciated by one skilled in the art that variations of these specific details are possible while still achieving the results of the present invention. In other instance, well-known components are not described in detail in order not to unnecessarily obscure the present invention.

Please refer to FIGS. 2A and 2B, in which FIG. 2A illustrates a cross-sectional view of the RFID device according to one embodiment of the present invention, and FIG. 2B illustrates a top view of the antenna structure shown in FIG. 2A. In the present embodiment, the RFID device 2 comprises a substrate 20 and an antenna structure connected to the substrate 20. The antenna structure comprises a first metal layer 21 as a conductive radiation part, and a second metal layer 22 as a conductive ground part. In the present embodiment, the substrate 20 is made of an insulation material. In one embodiment, the substrate 20 is a flexible substrate such as foam substrate or plastic substrate, for example. Alternatively, the substrate 20 can be a rigid substrate, such as rigid plastic substrate. The substrate 20 comprises a first surface 200 and a second surface 201 both extending along the longitudinal direction and traverse direction, in which the first surface 200 is the top surface of the substrate 20, and the second surface 201 is the bottom surface of the substrate 20. The thickness of the substrate 20 is preferably ranged between 0.2~5 mm, but should not be limited thereto.

Figure 3:
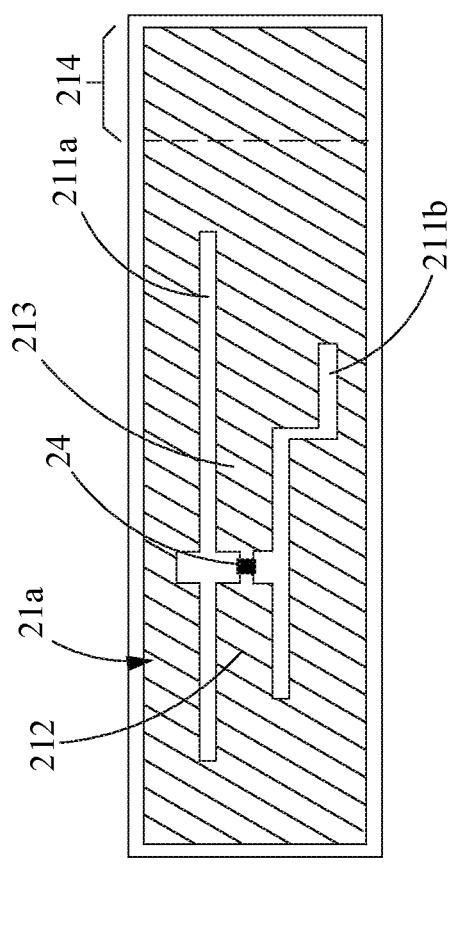
FIG. 3 illustrates a first metal layer according to another embodiment of the present invention.

The first metal layer 21 comprises a first connecting surface 215 and a first adhering layer 23a is formed on the first connecting surface 215 of the first metal layer 21. The first metal layer 21 is adhered on the first surface 200 of the substrate 20 through the first adhering layer 23a. In one embodiment, the length L along the longitudinal axis of the first metal layer 21 is ranged between 35~110 mm. The first adhering layer 23a is a non-conductive adhesive which can be, but should not be limited to, acrylic glue. The thickness of the first adhering layer 23a can be ranged between 0.02~0.15 mm. The first metal layer 21 is electrically connected to the RFID element 24. In the present embodiment, in the top view, the first metal layer 21 comprises a recess 210 formed at a lateral side and extending inwardly from the lateral side of the first metal layer 21. In addition, the first metal layer 21 also comprises a hollow area 211 formed inside the first metal layer 21 thereby forming a first connecting conductive structure 212 and a second connecting conductive structure 213 between the hollow area 211 and the recess 210, wherein the first connecting conductive structure 212 and the second connecting conductive structure 213 respectively represent the positive electrode and the negative electrode for electrically connecting to the RFID element 24 (note that the first and second conductive structures 212 and 213 are not connected in the area under the RFID element 24). It is noted that there is no specific limitation to the shape of the first and second conductive structures 212 and 213, the hollow area 211 and the recess 210; therefore, the shapes of the above described structures are not limited to the illustration shown in drawings of the present invention. In addition, the first and second conductive structures 212 and 213 are not limited to be formed between the recess 210 and hollow area 211. For example, please refer to FIG. 3, which illustrates another embodiment of the first metal layer. In the present embodiment, the first metal layer 21a comprises a first hollow area 211a and a second hollow area 211b internally formed inside the first metal layer 21a without any connection with the boarder of the first metal layer 21a, and the first and second conductive structures 212 and 213 are formed between the first and the second hollow areas 211a and 211b for electrically connecting to the RFID element 24.

Please refer back to the FIGS. 2A and 2B, the first metal layer 21 is adhered off-center or asymmetrically with respect to the central axis CL along the longitudinal direction of the substrate 20 through the first adhering layer 23a. In another words, the central axis CL of the substrate 20 along the longitudinal direction is not aligned with the central axis CL1 of the first metal layer 21 along the longitudinal direction. Moreover, one side of the first metal layer 21 protrudes outwardly from a second lateral surface 203 of the substrate 20 thereby forming a first extension part 214, while another side of the first metal layer 21 is not protruded outwardly from a first lateral surface 202 of the substrate 20. In the present embodiment, the second metal layer 22 is formed onto a second surface 201 opposite to the first surface 200 of the substrate 20. In one embodiment, the length L along the longitudinal axis of the first metal layer 21 and the second metal layer 22 is ranged between 35~110 mm and the aspect ratio associated with the length and width is ranged between 1:1~8:1. In the present embodiment, the second metal layer 22 has a second connecting surface 220 adhered to the second surface 201 of the substrate 20 through a second adhering layer 23b. In the present embodiment, the second adhering layer 23b is non-conductive material having thickness ranged between 0.02~0.15 mm. In the present embodiment, the length of the first metal layer 21 is the same as the length of the second metal layer 22 and the second metal layer 22 is a solid metal layer without hollow area formed therein. The first metal layer 21 and the second metal layer 22 can be formed by gold, silver, copper or aluminum material or alloy contained gold, silver, copper, or aluminum material. In a preferred embodiment, the first and the second metal layers 21 and 22 are aluminum foil, respectively.

In the embodiment shown in FIG. 2A, it is noted that the second metal layer 22 is adhered off-center or asymmetrically with respect to the central axis CL along the longitudinal direction of the second surface 201 of the substrate 20 through the second adhering layer 23b. Moreover, one side of the second metal layer 22 protrudes outwardly from the second lateral surface 203 of the substrate 20 thereby forming a second extension part 221, while another side of the second metal layer 21 is not protruded outwardly from the first lateral surface 202 of the substrate 20. In the present embodiment, the first extension part 214 is adhered to the second extension part 221 through the first adhering layer 23a such that the first metal layer 21 is electrically insulated from the second metal layer 22. It is note that although there exists a gap S between the first metal layer 21 and the second lateral surface 203 in FIG. 2A, it depends on the manufacturing process so the gap S is not a limitation of the present invention. In the present embodiment, since the first extension part 214 of the off-center or asymmetrically arranged first metal layer 21 is adhered to the second extension part 221 through a pressing and adhering process operated by a jig, the manufacturing process is easily practiced because there is no need to electrically connect the first metal layer 21 with the second metal layer 22 and to fold the metal layer like the conventional PIFA antenna whereby the problem of mass production of the conventional antenna design could be solved.

Figure 4A:
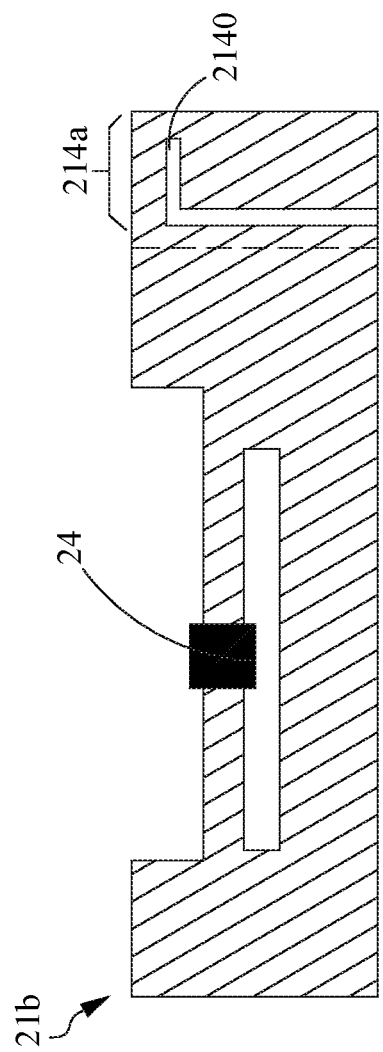
FIGS. 4A to 4C respectively illustrate different embodiments of the first extension part of the first metal layer of the present invention.
Figure 4B:
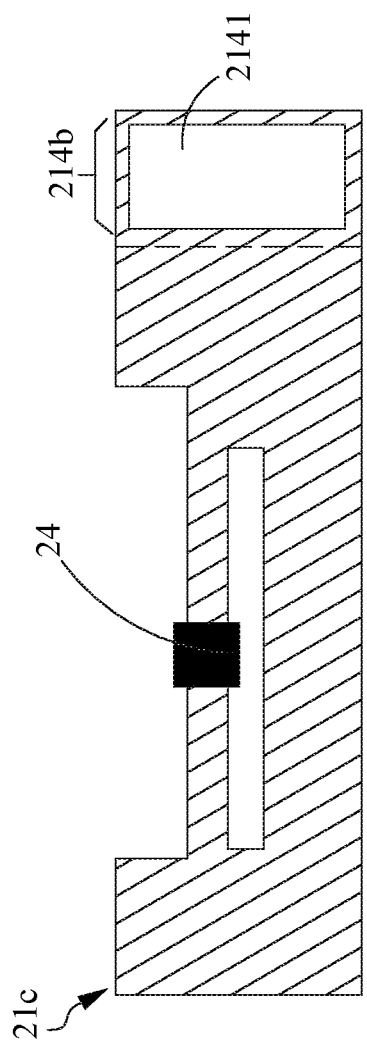
Figure 4C:
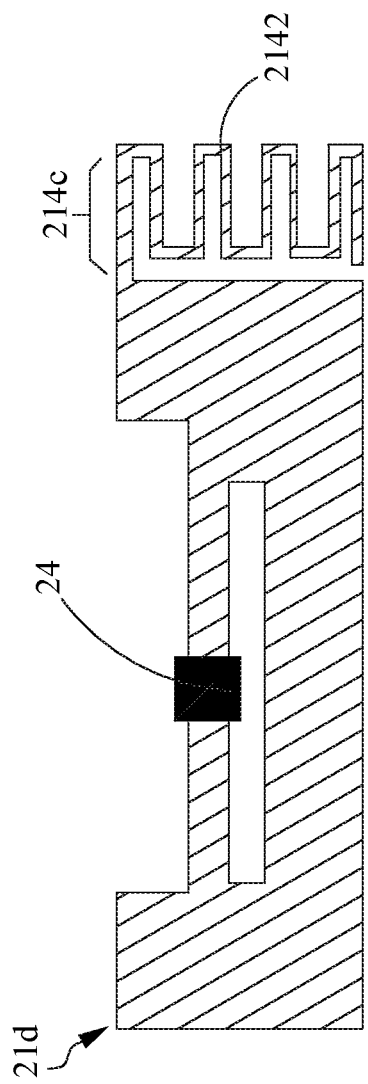

Furthermore, it is also noted that although the first extension part 214 shown in FIGS. 2A and 2B is a solid metal layer without pattern formed therein, it is not limited to the embodiment shown in FIGS. 2A and 2B. For example, please refer to FIGS. 4A to 4C, which respectively illustrate the first extension part according to different embodiments of the present invention. In FIG. 4A, the first extension part 214a of the first metal layer 21b is not a solid metal layer but has an L-shaped hollow area 2140 is formed inside the first extension part 214a. In addition, please refer to FIG. 4B, in this embodiment, the first extension part 214b of the first metal layer 21c is not a solid metal layer but has a rectangular-shaped hollow structure 2141 formed therein. In the embodiment shown in FIG. 4C, the first extension part 214c of the first metal layer 21d is not a solid metal layer, but is a meander structure 2142. In another embodiments (not shown), the first extension part is a spiral structure.

Figure 5C:
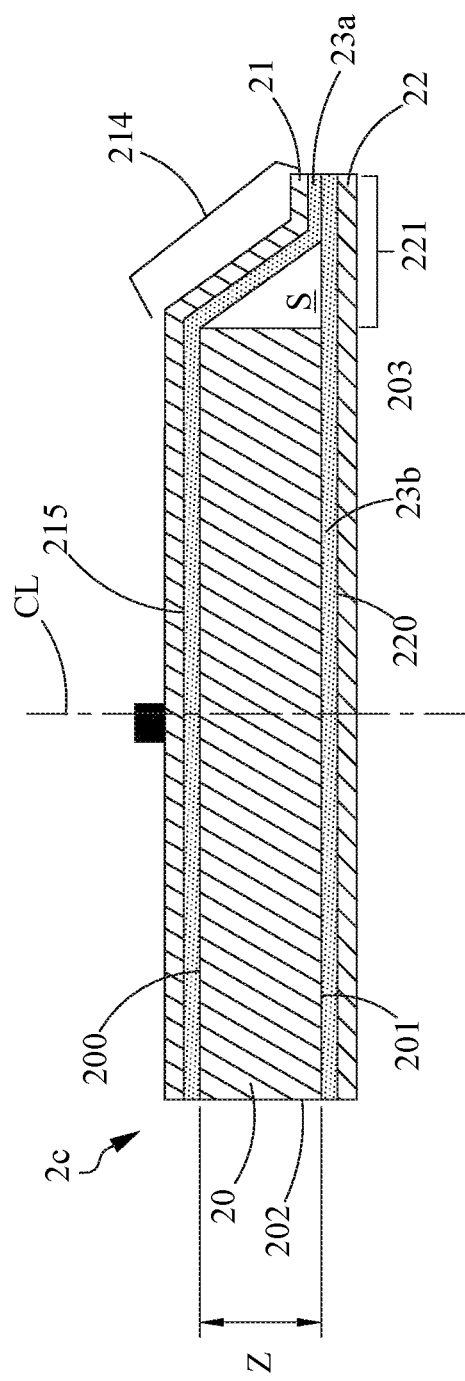
Figure 5D:
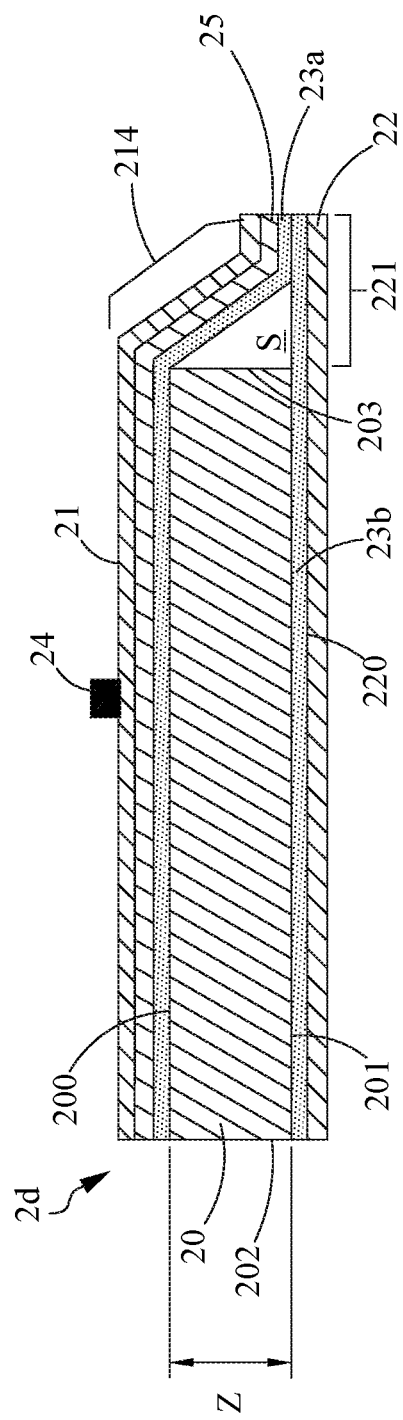

Please refer to FIGS. 5A to 5D, which illustrate RFID devices according to alternative embodiments of the present invention. The RFID device 2a shown in FIG. 5A is basically similar to the RFID device shown in FIG. 2A, wherein the different part is that the first metal layer 21 is formed on a polymer material layer 25 and the polymer material layer 25 is adhered to the first surface 200 of the substrate 20 through the first adhering layer 23a. The polymer material layer 25 can be, but should not be limited to, polyethylene terephthalate (PET) material or polyimide (PI) material. The RFID device 2b shown in FIG. 5B is basically similar to the embodiment shown in FIG. 5A, the different part is that the polymer material layer 25 having the first metal layer 21 formed thereon is up-side-down as compared to FIG. 5A, i.e., the polymer material layer 25 is formed on top of the first metal layer 21, such that the first metal layer 21 electrically connected to the RFID element 24 is directly adhered to the first adhering layer 23a so that the RFID element 24 is arranged between the first metal layer 21 and the first adhering layer 23a. The RFID device 2c shown in FIG. 5C is basically similar to the embodiment shown in FIG. 2A, and the different part is that the second adhering layer 23b is outwardly extending to the second extension part 221 such that the first adhering layer 23a and the second adhering layer 23b are adhered to each other whereby the first metal layer 21 and the second metal layer 22 are electrically insulated from each other. The RFID device 2d shown in FIG. 5D is similar to the embodiment shown in FIG. 5A, and the different part is that the second adhering layer 23b extends outwardly to adhere onto the second extension part 221 and is adhered to the first adhering layer 23a.

Please refer to FIG. 5E. In this embodiment, the RFID device 2e is arranged on the surface of the object 90. The object 90, in the present embodiment, is a metal object. The second metal layer 22, in the present embodiment, does not have the second extension part like previously illustrated embodiments, so the first extension part 214 of the first metal layer 21 does not connect with the second metal layer 22 but is directly adhered to the surface of the object 90 through the first adhering layer 23a such that the first metal layer 21 is electrically insulated from the second mental layer 22. Alternatively, in another embodiment of the RFID device 2f shown in FIG. 5F, the first metal layer 21 is formed on a polymer material layer 25a which is adhered to the substrate 20 through the first adhering layer 23a. In addition, a surface of the second metal layer 22 is adhered to another polymer material layer 25b. The first metal layer 21 and the second metal layer 22 are adhered to each other through the first adhering layer 23a and the second adhering layer 23b such that the first metal layer 21 is electrically insulated from the second metal layer 22.

Figure 5G:
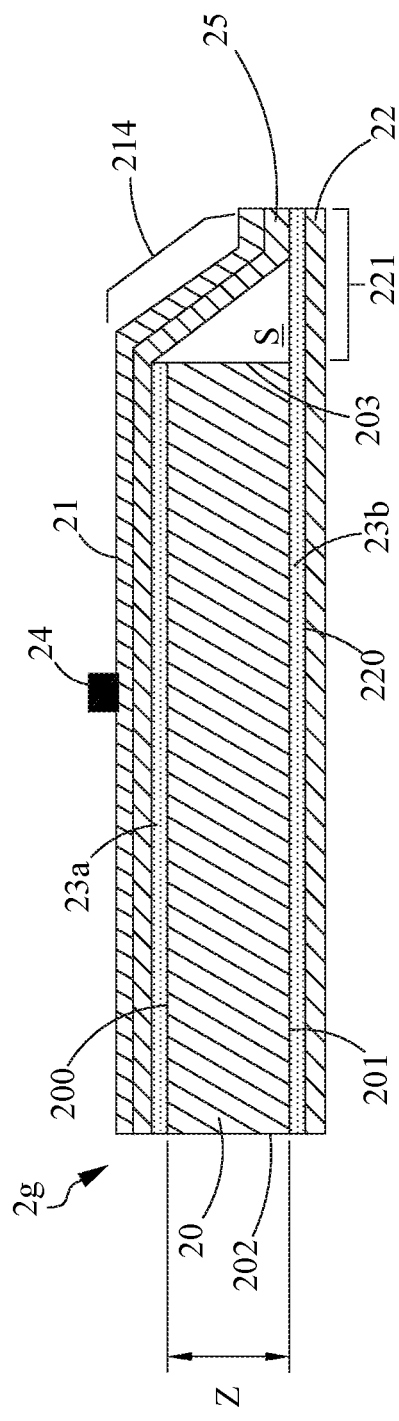

Please refer to the embodiment shown in FIG. 5G. The RFID device 2g shown in FIG. 5G is basically similar to the embodiment shown in FIG. 5D in which the first metal layer 21 is formed on the polymer material layer 25 and the first adhering layer 23a is only adhered to the first surface 200 without adhering on the first extension part 214. The first extension part 214 is directly adhered to second metal layer 22 through the polymer material layer 23b. Likewise, the RFID device 2c shown in FIG. 5C can be modified that the first adhering layer 23a corresponding to the first extension part 214 is absent such that the first extension part 214 is directly connected to the second adhering layer 23b whereby the first metal layer 21 is still electrically insulated from the second metal layer 22. Please refer to FIG. 6. The RFID device 2h is basically similar to the embodiment shown in FIG. 5C, the different part is that the first metal layer 21 comprises two first extension parts 214 and 214a respectively extending outwardly from the two lateral surfaces of the substrate 20 and the second metal layer 22 comprises two second extension parts 221 and 221a respectively extending outwardly from the two lateral surfaces of the substrate 20 wherein the first extension parts 214 and 214a are respectively adhered to second extension parts 221 and 221a through the first and second adhering layers 23a and 23b.

Figure 7A:
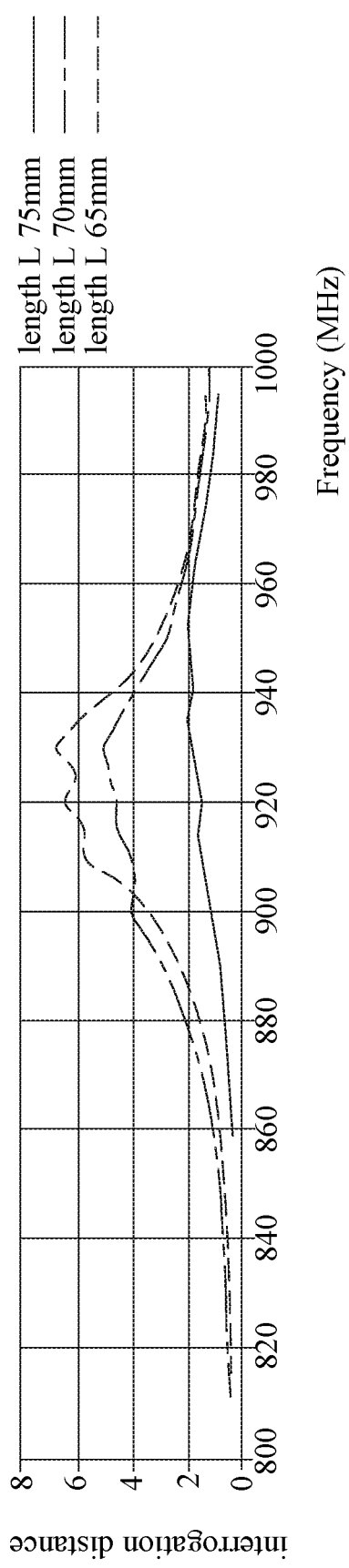
FIGS. 7A and 7B respectively illustrate a relationship between the interrogating distance and frequency of different RFID devices having the same first and second metal layers and substrates having different dimension.

Next, the effect of the present invention is explained below. Please refer to FIGS. 7A and 7B, which respectively illustrate a relationship between the interrogation distance and operation frequency with respect to different dimensions of the substrates respectively having first metal layer and second metal layer with the same length. The length (L+L2) of first metal layer 21 and second metal layer 22 is fixed to 75 mm, wherein L represents the length of the substrate that is a foam material substrate having thickness 1.05 mm. There are three values of length L of the substrate in the FIG.

Figure 7B:
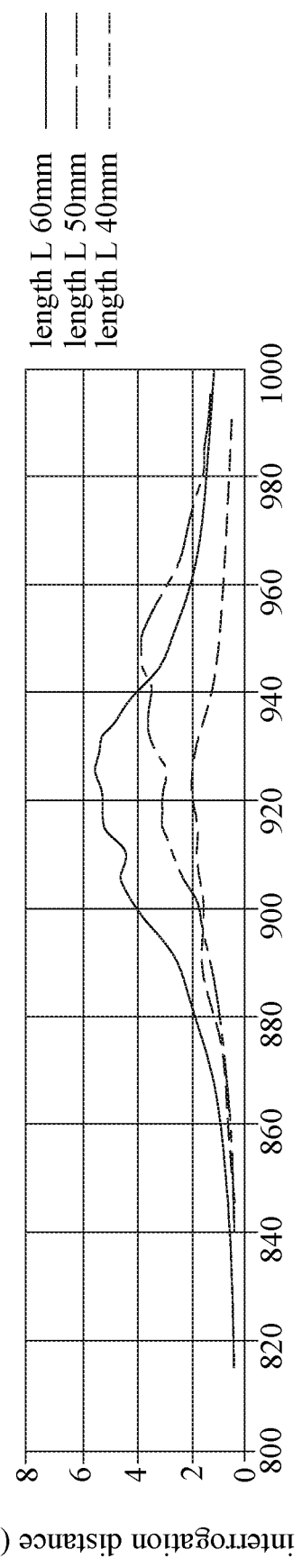

7A in which L is 75 mm, L is 70 mm, and L is 65 mm, respectively while there are three values of length L of the substrate shown in FIG. 7B in which L is 60 mm, L is 50 mm, and L is 40 mm. When the RFID device, in which the total length (L+L2) of the first metal layer 21 and the second metal layer 22 of the RFID device are respectively 75 mm, and the length L of the substrate is 75 mm, i.e., there are no extension parts, is arranged onto a surface of metal object, the interrogation distance is only 2 meter and the simulation gain of the antenna is −10.5 dBi. The bad gain performance of the RFID device occurred because a huge parallelly connected capacitor is generated whereby the interrogation energy cannot radiated effectively. According to the theoretic formula (1), i.e. FRIIS free-space formula, with respect to transmitting distance shown below, the interrogation distance will be short if the gain is small. Accordingly, if the length of the metal layer is the same as the length of the substrate, the interrogation distance will be affected by the metal object and cannot be effectively increased.

$$r = \frac{\lambda}{4\pi}\sqrt{\frac{P_t G_t G_r \tau}{P_{th}}} \quad (1)$$

It is noted that the formula (1) is related to the broadcast of electromagnetic wave in the free space, wherein $P_{th}$ is the lowest start power of IC chip, $\lambda$ is the wavelength of the center frequency, $G_r$ is the gain of the antenna structure, $\tau$ is the power transmission coefficient, $P_t$ is the accessing power strength of the reader, and $G_t$ is the maximum gain of the antenna of the reader.

According to the above descriptions, when the length L of the substrate 20 is equal to the length (L+L2) of the first and second metal layers 21 and 22, the radiation energy cannot be radiated effectively because a huge parallelly connected capacitors is generated. Therefore, when the length L of the substrate is shorten to 70 mm and the length of the first extension part 214 of the first metal layer 21 adhered to the second extension part 221 of the second metal layer 22 is 5 mm, a serially connected capacitor is formed by adhering the first extension part 214 to the second extension part 221 thereby reducing the total capacitive effect of the antenna such that the interrogation energy can be effectively radiated, e.g. increasing the simulation gain of the antenna from −10.5 dBi to −5.2 dBi for extending the interrogation distance. In this embodiment, the interrogation distance of the RFID device 2 arranged on the surface of the metal object is extended to 4.5 meter. When the length L of the substrate is reduced to 65 mm, and the length L2 of the first extension part 214 of the first metal layer adhered to the second extension part 221 of the second metal layer 22 is 10 mm, the simulation gain is increased to −3.6 dBi. According to the simulation result, this embodiment has best simulation gain such that the interrogation distance of the RFID device 2 arranged on the surface of the metal object is extended to 6 meter. When the length L of the substrate is reduced to 60 mm, and the length L2 of the first extension part 214 of the first metal layer 21 adhered to the second extension part 221 of the second metal layer 22 is 15 mm, the simulation gain is increased to −5.1 dBi such that the interrogation distance of the RFID device 2 arranged on the surface of the metal object is extended to 4.5 meter.

Figure 7C:
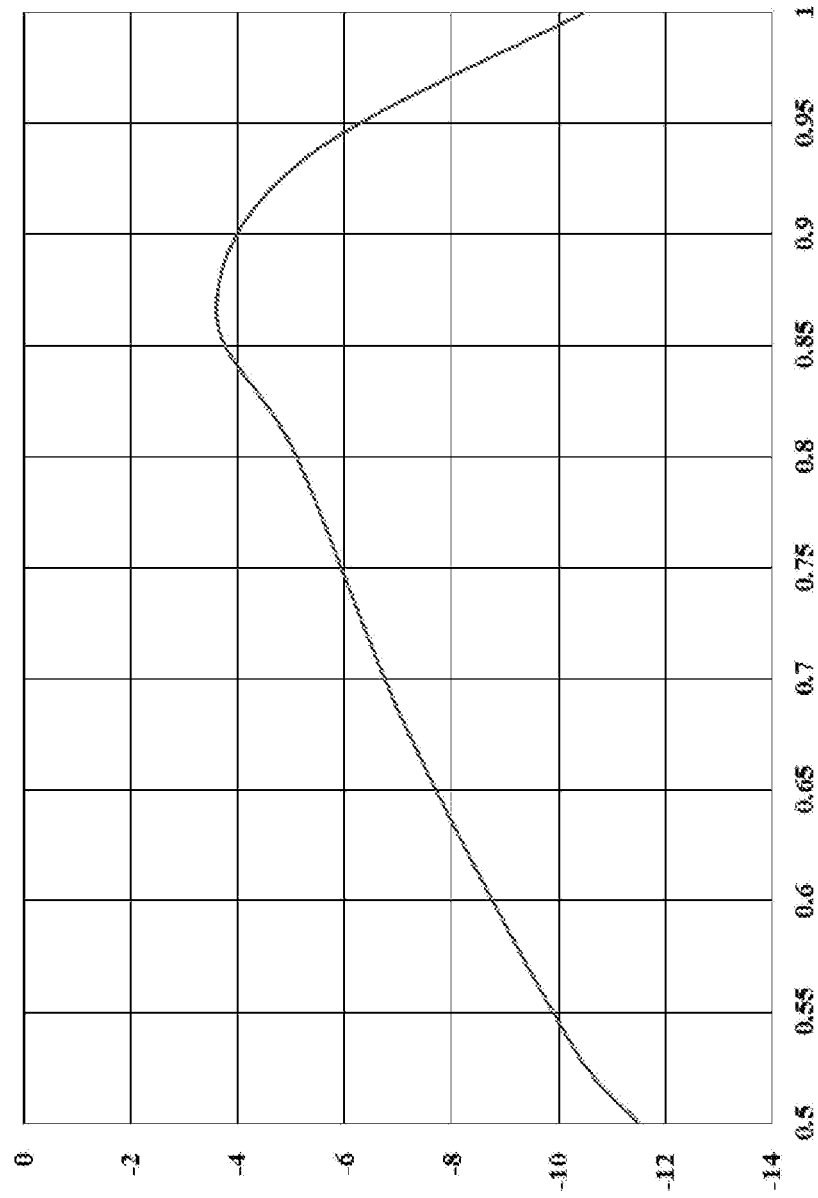
FIG. 7C illustrates a relationship between the gain of the antenna structure and the antenna dimension.

Moreover, when the length L of the substrate is reduced to 40 mm and 50 mm, and the length L2 of the first extension part 214 of the first metal layer 21 adhered to the second extension part 221 of the second metal layer 22 is 35 mm and 25 mm, respectively, the interrogation distance of the RFID device 2 arranged on the surface of the metal object is greatly shortened because the insulation area between the first metal layer 21 and surface of the metal object is greatly reduced. In other words, the area of the first extension part 214 is relatively increased such that the interference with the first metal layer 21 generated by the metal object are increased. According to the above described data, please refer to FIG. 7C, which illustrates a relationship between the gain of antenna and the dimension ratio (x/y) wherein y represents the length of the first and second metal layer 21 and 22, which is fixed to 75 mm in the present embodiment, and x represents the length of the substrate. It is noted that when the length difference between the first and second metal layer 21 and 22 and substrate 20 is 5~15 mm, i.e. the dimension ration (x/y) is around 0.8~0.933, better antenna gain can be obtained for increasing the interrogation distance.

Next, a method for making the RFID device is described as below. Firstly, an antenna structure is formed on a substrate, in which the antenna structure comprises a first metal layer, and a second metal layer, wherein the length of the first metal layer and the second metal layer are longer than the length of the substrate such that a part of the first metal layer extending outwardly from a lateral side of the substrate forms a first extension part and a part of the second metal layer extending outwardly from the lateral side of the substrate forms a second extension part. After that, the first extension part is adhered to the second extension part wherein the first extension part is electrically insulated from the second extension part. Next, for more detail, the RFID device shown in FIG. 6 is taken as an exemplary embodiment for explaining the manufacturing process.

Figure 6:
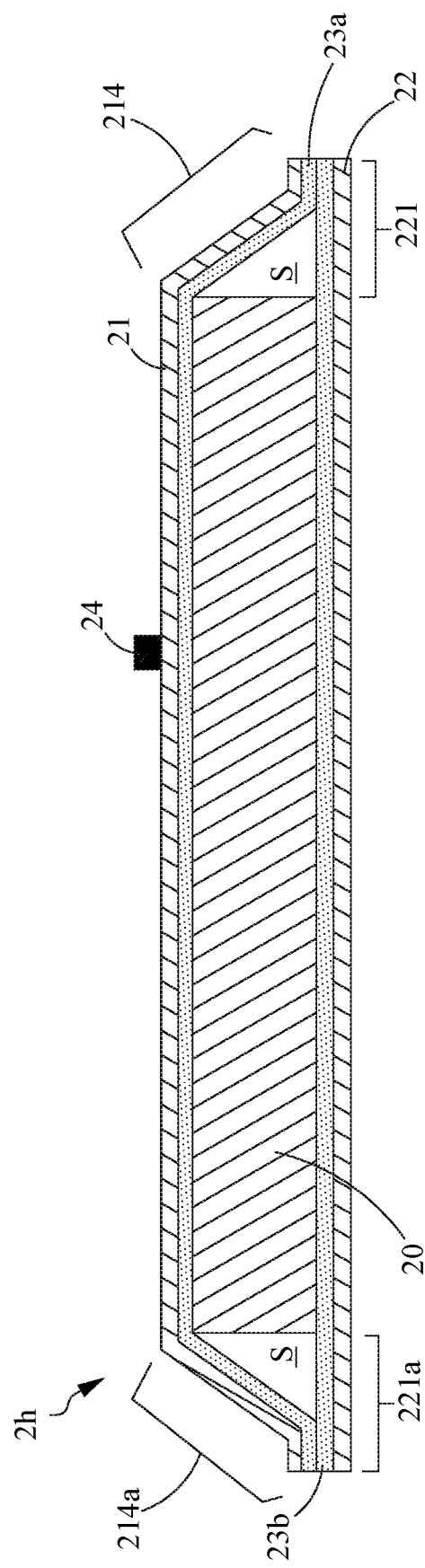
FIG. 6 illustrates cross-sectional view of the RFID device according to another embodiment of the present invention.

Please refer to FIGS. 8A to 8G, which illustrates one embodiment of the process for making an RFID device which has the general shape of that of FIG. 6 (i.e. having extension parts on both lateral sides). In the present embodiment, the process is started by providing a substrate 20 and a second metal layer 22. In the present embodiment, the thickness of the substrate 20 is 0.2~5 mm, and a second surface 201 of the substrate 20 has an adhering layer 23b with a release paper 23c formed on the second surface 201. In the present embodiment, the length L of the substrate 20 is 65 mm. It is noted that the length L of the substrate 20 is determined according to the user need, and it is not limited to 65 mm. The second metal layer 22 is formed on the polymer material layer 25 which is taken as a supporting material for supporting the second metal layer 22. In the present embodiment, the polymer material layer 25 can be formed by polyethylene terephthalate (PET) material or polyimide (PI) material but should not be limited thereto.

Figure 8A:
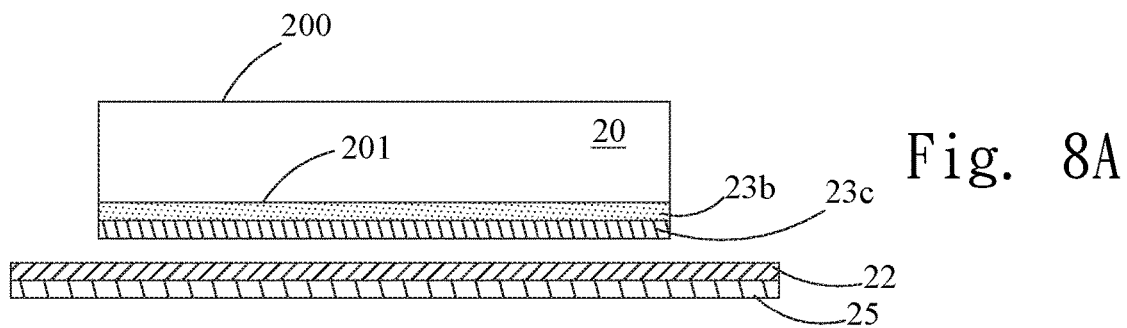
FIGS. 8A to 8G illustrate a manufacturing flow of the RFID device according to one embodiment of the present embodiment.
Figure 8B:
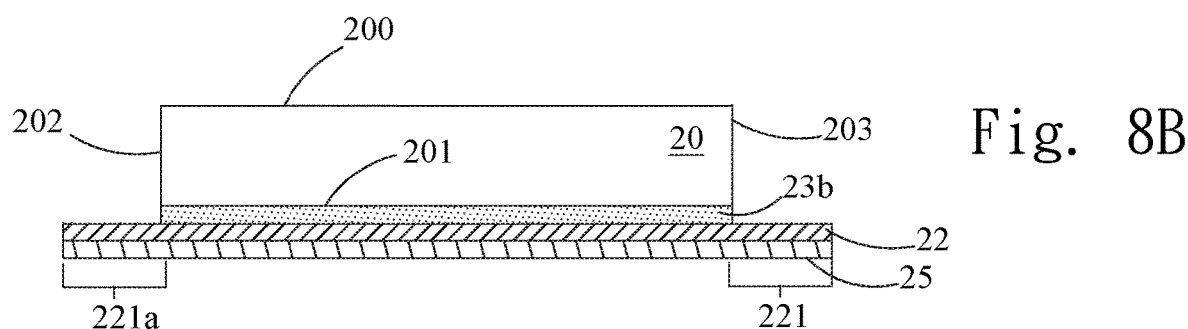

Next, in the FIG. 8B, the release paper 23c is removed from the substrate 20 and the second adhering layer 23b is adhered to the second metal layer 22. In the present embodiment, the substrate 20 is adhered to the second metal layer 22 and the central axis of the substrate 20 is corresponding to the central axis of the second metal layer 22 such that the two second extension parts 221 and 221a of the second metal layer 22 are outwardly formed from the two opposite lateral surface 202 and 203 of the substrate 20, respectively. In the present embodiment, the length of the second metal layer 22 is 75~90 mm, which is determined according to the requirement of user but should not be limited thereto.

Figure 8C:
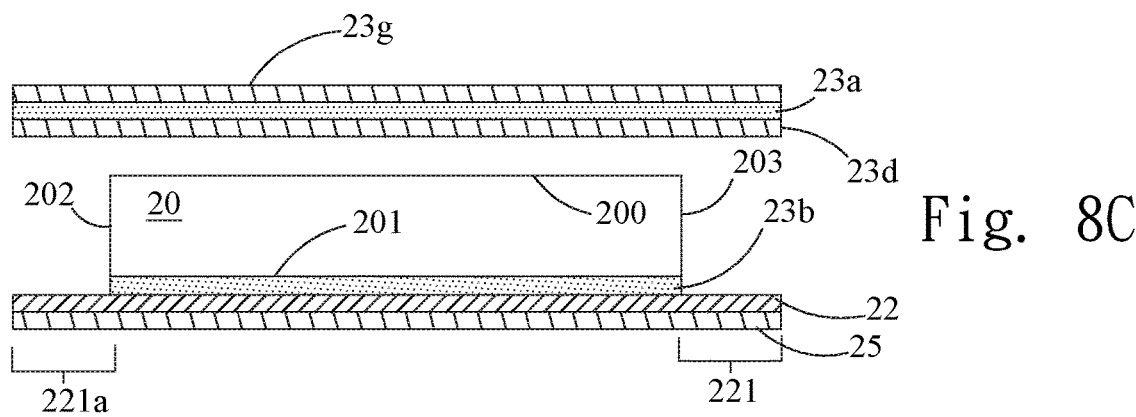
Figure 8D:
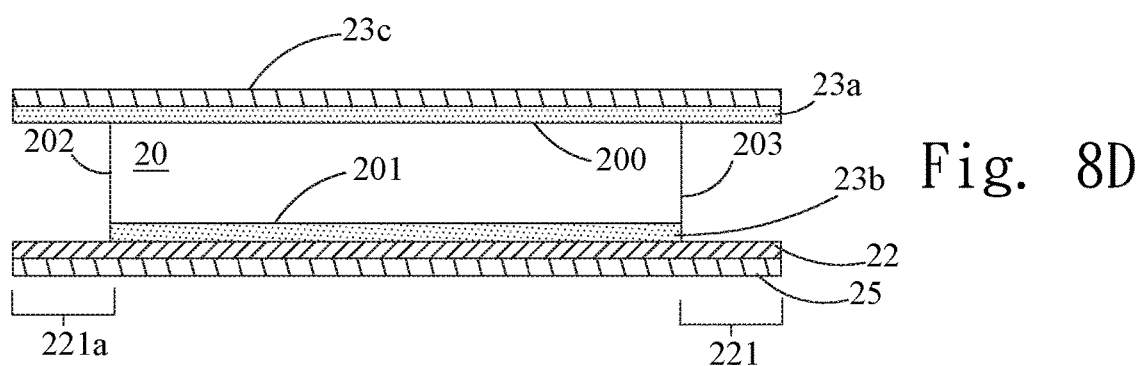

Please refer to FIG. 8C, after adhering the substrate 20 to the second metal layer 22, a first adhering layer 23a having release paper 23g and 23d respectively cover on the two surfaces of the first adhering layer 23a is provided. After that, as shown in FIG. 8D, the adhering layer 23a is revealed by removing the release paper 23d and the adhering layer 23a is then adhered to the first surface 200 of the substrate 20. In the present embodiment, the position of the central axis along the longitudinal direction of the substrate 20 is corresponding to that of the central axis of the first adhering layer 23a such that the two extending adhering layers are outwardly formed from two opposite lateral surface 202 and 203 of the substrate 20, respectively. Thereafter, the release paper 23g shown in FIG. 8D is removed and another polymer material layer 25a having the first metal layer 21 is adhered to the first adhering layer 23a (the surface of the polymer material layer 25a that is adhered to the first adhering layer 23a is the opposite of the surface that has the first metal layer 21), thereby forming the structure shown in FIG. 8E. In the present embodiment, the first metal layer 21 is adhering onto the substrate 20 and the position of the central axis along the longitudinal direction of the first metal layer 21 is corresponding to that of the central axis of the substrate 20 such that the two first extension parts 214 and 214a of the first metal layer 21 corresponding to the two second extension parts 221 and 221a are outwardly formed from the two opposite lateral surface 202 and 203 of the substrate 20, respectively. In the present embodiment, the length of the first metal layer 21 is 75~90 mm, which is determined according to the requirement of user but should not be limited thereto.

Figure 8E:
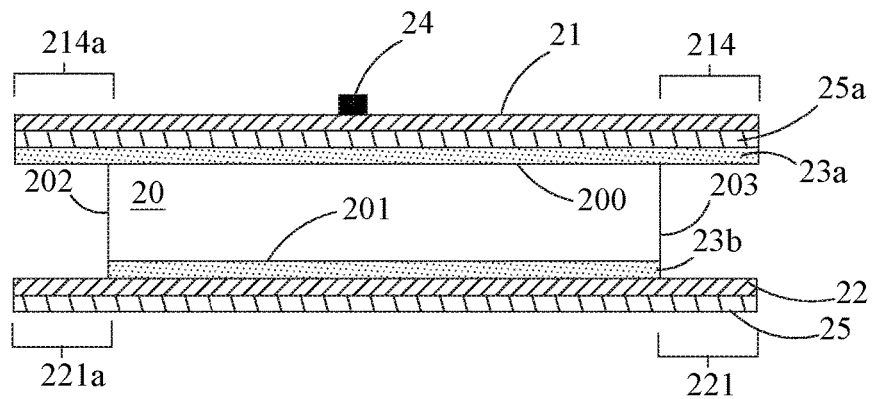
Figure 8F:
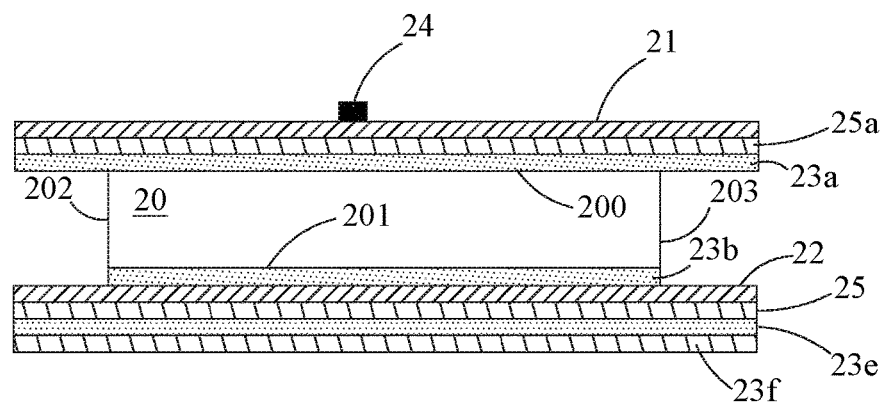
Figure 8G:
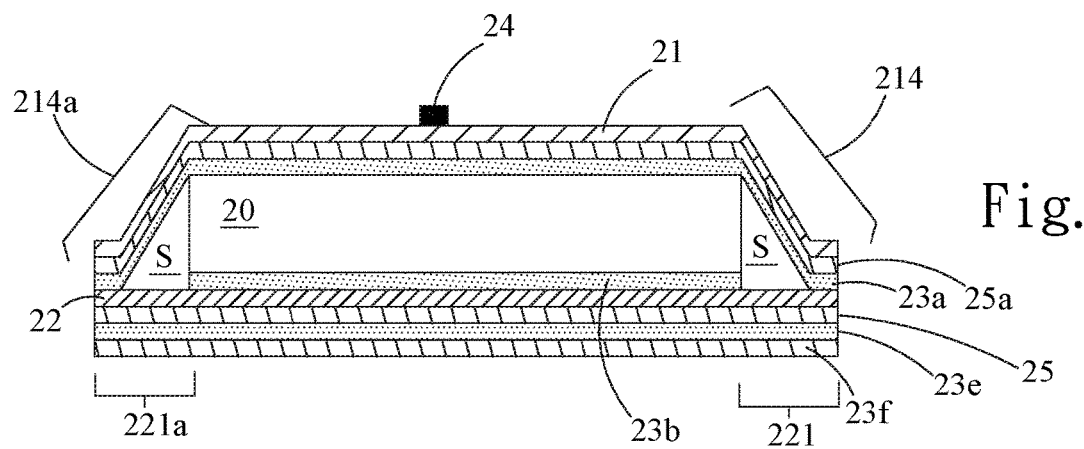

Please refer to FIG. 8F, which illustrates a step for arranging the structure shown in FIG. 8E to the third adhering layer 23e. In the embodiment shown in FIG. 8E, the polymer material layer 25 is adhered to one surface of the third adhering layer 23e while a release paper 23f is adhered to the opposite surface of the third adhering layer 23e. Next, please refer to FIG. 8G, a pressing step is utilized to press the first extension part 214 and 214a such that the first extension parts 214 and 214a are firmly adhered to the second extension parts 221 and 221a, respectively. It is noted that, since the first extension parts 214 and 214a are adhered to the second extension parts 221 and 221a through the first adhering layer 23a, and the first adhering layer 23a and the polymer material layer 25 are formed by electrically non-conductive material, the first metal layer 21 and the second metal layer 22 are electrically insulated from each other. After that the structure shown in FIG. 8G can be cut according to the required dimension through die-cut mold. It is also noted that although the FIGS. 8A~8G show the manufacturing process for making the RFID device which has the general shape of device 2h shown in FIG. 6, the other RFID devices shown in FIG. 2A~FIG. 5G having extending part at one side of the substrate and having different layer structures can be achieved according to the spirits illustrated in the FIGS. 8A~8G.

According to the embodiments shown above, the RFID device of the present invention comprises adhesive area formed on the top and bottom surfaces of the substrate respectively having first metal layer and second metal layer adhered thereon. The adhesive areas in the extension parts are utilized to adhere the first metal layer to the second metal layer in these areas and electrically insulate the first metal layer from the second metal layer. The embodiments shown above can be effectively applied to the metal object with a better interrogation distance. Moreover, the manufacturing process is relatively simple comparing with the prior arts, and RFID devices can be easily made whereby the conventional complicated manufacturing process such as folding metal layer, folding the metal layer for covering three surfaces or four surfaces of the substrate can be simplified and the problem due to the conventional complicated manufacturing process can be effectively solved.

While the present invention has been particularly shown and described with reference to a preferred embodiment, it will be understood by those skilled in the art that various changes in form and detail may be without departing from the spirit and scope of the present invention.

What is claimed is:

1. An RFID device arranged onto a surface of an object, comprising:
    a substrate, comprising a first surface and a second surface opposite to the first surface; and
    an antenna structure, comprising:
        a first metal layer, connected to the first surface, wherein a length of the first metal layer along a longitudinal direction is longer than a length of the substrate along the longitudinal direction, and the first metal layer further comprising a first extension part protruding along the longitudinal direction from at least one lateral side of the substrate;
        an RFID element, electrically connected to the first metal layer; and
        a second metal layer, connected to the second surface;
        wherein the first extension part is connected to the surface of the object or connected to the second metal layer and the first metal layer is electrically insulated from surface of the object or the second metal layer.

2. The RFID device of claim 1, wherein the first extension part is formed at two opposite lateral sides of the substrate separated along the longitudinal direction.

3. The RFID device of claim 1, wherein the first metal layer is connected to the first surface through a first adhering layer.

4. The RFID device of claim 3, wherein the first metal layer is formed on a polymer material layer and the polymer material layer is formed between the first metal layer and the first adhering layer.

5. The RFID device of claim 3, wherein a polymer material layer is formed on the first metal layer such that the first metal layer is formed between the polymer material layer and the first adhering layer, and the RFID element is arranged between the first adhering layer and the first metal layer.

6. The RFID device of claim 1, wherein a length of the second metal layer is longer or equal to the length of the substrate.

7. The RFID device of claim 1, wherein the substrate is a flexible substrate or a rigid substrate.

8. The RFID device of claim 1, wherein the first metal layer further comprises a first connecting conductive part and a second connecting conductive part electrically connected to the RFID element, respectively.

9. The RFID device of claim 1, further comprising a conductive structure formed on the first extension part, wherein the first conductive structure is a solid conductive structure, a conductive structure having a hollow structure, a spiral structure, or a meander structure.

10. The RFID device of claim 1, wherein the second metal layer further comprises a second extension part protruding along the longitudinal direction from at least one lateral side of the substrate.

11. The RFID device of claim 10, wherein a length of the second extension part is ranged between 5~15 mm.

12. The RFID device of claim 10, wherein a length of the first metal layer or the second metal layer is ranged between 35~110 mm.

13. The RFID device of claim 1, wherein the second metal layer is connected to a polymer material layer.

14. The RFID device of claim 1, wherein a connecting length that the first extension part is connected to the second metal layer is ranged between 5~15 mm.

15. The RFID device of claim 1, wherein a thickness of the substrate is ranged between 0.2~5 mm.

16. The RFID device of claim 1, wherein an aspect ratio of the first metal layer is ranged between 1:1~8:1, and an aspect ratio of the second metal layer is ranged between 1:1~8:1.

17. The RFID device of claim 1, wherein the first metal layer is connected to the first surface through a first adhering layer, and the second metal layer is connected to the second surface through a second adhering layer.

18. The RFID device of claim 17, wherein the first extension part is connected to the surface of the object or the second metal layer through an adhering material, wherein the adhering material is the first adhering layer, a second adhering layer or a combination of the first and the second adhering layers.

19. The RFID device of claim 18, wherein the adhering material is the non-conductive material having thickness ranged between 0.02~0.15 mm.

* * * * *